March 30, 1937.    E. M. POST, JR    2,075,225
HUMIDITY CONTROL FOR REFRIGERATING MECHANISM
Filed July 18, 1933    3 Sheets-Sheet 3
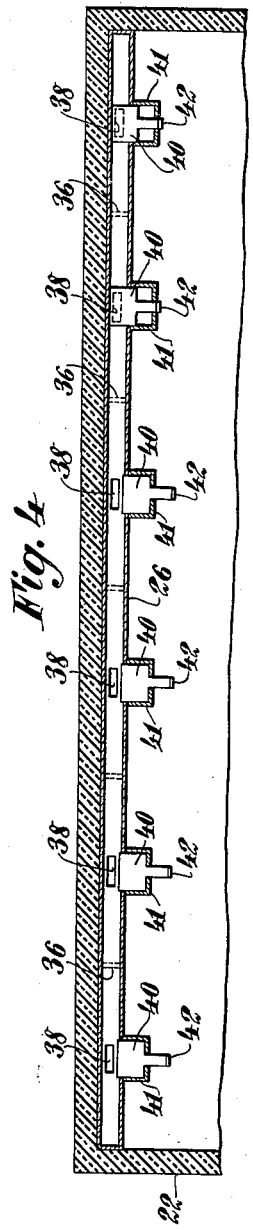
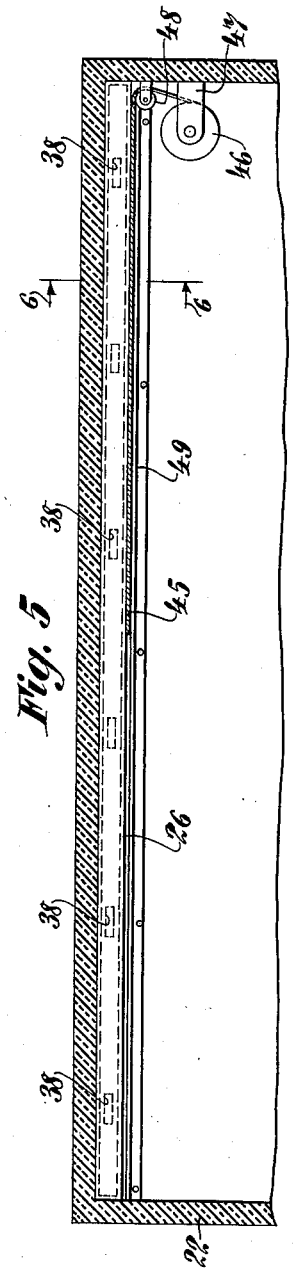
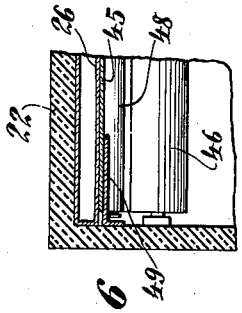
INVENTOR
Edwin M. Post, Jr.,
BY
HIS ATTORNEYS Patented Mar. 30, 1937

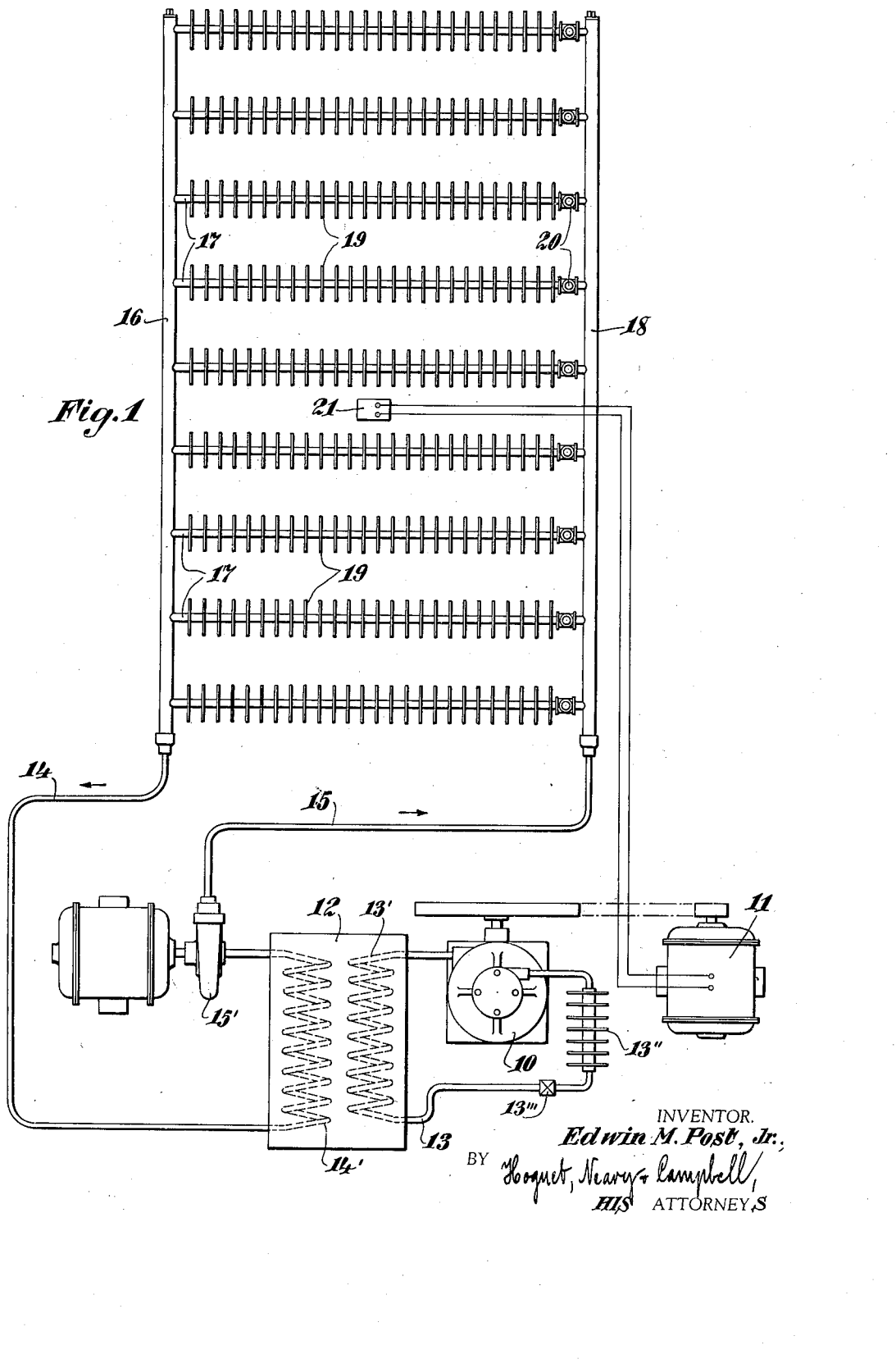

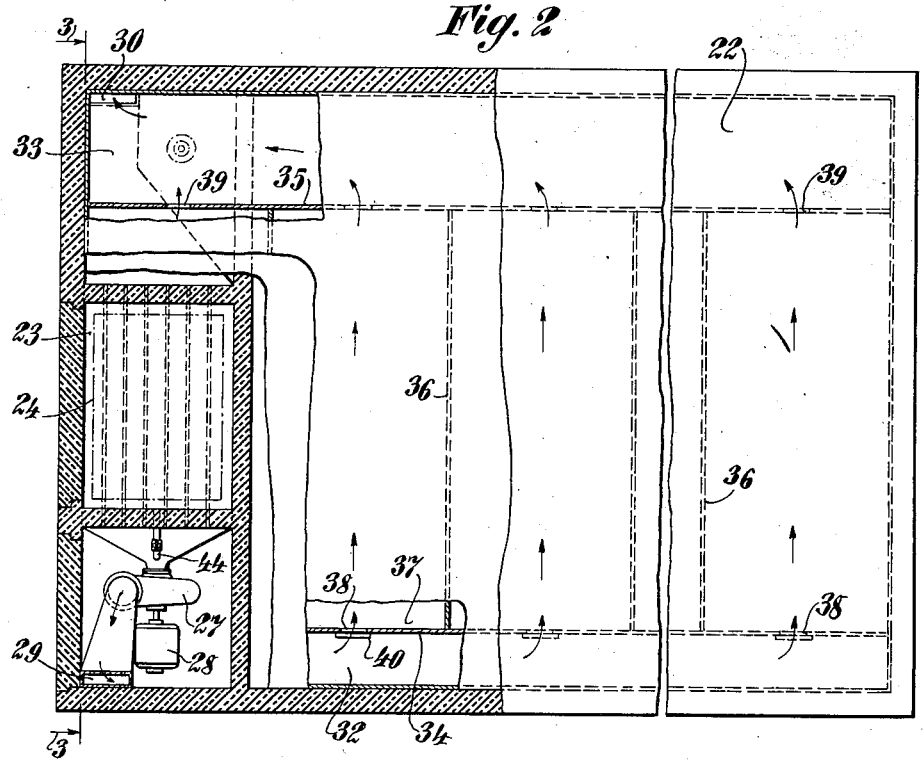
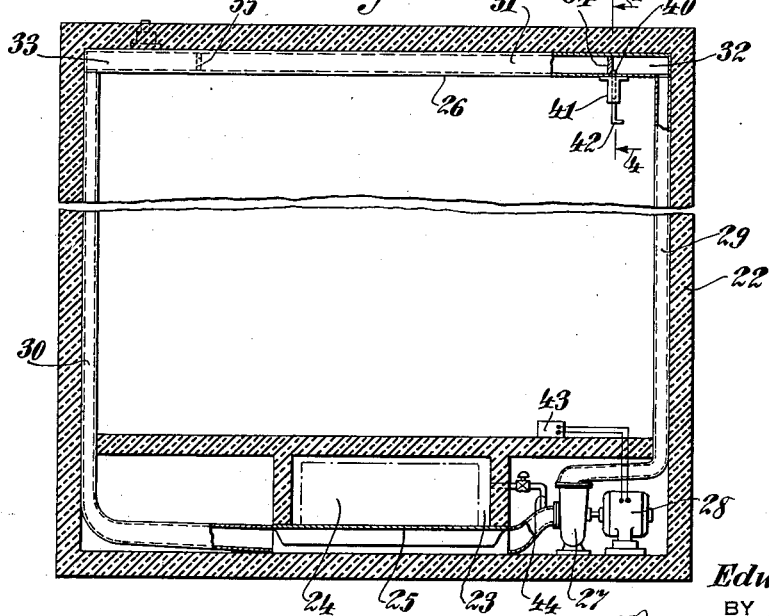

2,075,225

UNITED STATES PATENT OFFICE 2,075,225

HUMIDITY CONTROL FOR REFRIGERATING MECHANISM

Edwin M. Post, Jr., New York, N. Y., assignor to International Motor Company, New York, N. Y., a corporation of Delaware Application July 18, 1933, Serial No. 680,934

4 Claims. (Cl. 62—6)

The present invention relates to refrigerating mechanisms and embodies an improved refrigerating mechanism by means of which the humidity of a refrigerating compartment may be maintained at a predetermined value. It is generally known that certain products particularly food products, require storage conditions which include humidity values between certain limits. Under favorable conditions, the humidity condition frequently being the most important, these products may be transported and stored quite successfully. Transportation and storage under other conditions, however, frequently cause these products to perish and considerable attention has therefore been given to the factors of temperature and humidity in the storage of such products.

There have been recent attempts made to improve the conditions under which such substances are transported and the copending application of the present applicant Edwin M. Post, Jr., Serial No. 679,831, for Refrigeration mechanism for vehicle bodies, filed July 11, 1933 shows and describes one form of refrigerating mechanism for use in connection with the transportation of such substances. Such copending application shows and describes a refrigerating mechanism wherein the temperature difference between the space to be refrigerated and the heat interchange element associated therewith is maintained within a definite predetermined limit, thus avoiding excessive dehumidification and frosting which results from the moisture condensation taking place when the temperature of a fluid is suddenly and substantially reduced.

In accordance with the present invention, a system is provided by means of which the humidity of a refrigerated space is effectively controlled in addition to the control of the temperature thereof. Knowing the most favorable humidity conditions for a given substance, and the proper temperature for the storage and/or transportation thereof, the present invention proposes to provide a mechanism by means of which the predetermined temperature may be maintained, the temperature controlling mechanism being of such nature as to afford a means for setting up a desired temperature difference between the temperature of the heat interchange element and the temperature of the refrigerating compartment, whereby the moisture content in the refrigerating compartment may be effectively controlled.

Obviously, this invention is applicable to refrigerating mechanisms of all types whether designed for use in connection with the transportation of commodities or storage thereof, the drawings accompanying the present application showing adaptations of the invention in systems of several types.

An object of the invention, accordingly, is to provide a refrigerating mechanism by means of which an effective humidity control is afforded.

A further object of the invention is to provide a refrigerating mechanism by means of which a predetermined temperature may be preserved, at the same time maintaining a predetermined condition of humidity in the refrigerated space.

A further object of the invention is to provide a refrigerating mechanism wherein a temperature control is incorporated with a means for varying the temperature difference between the refrigerated space and the heat interchange element associated therewith.

A further object of the invention is to provide a refrigerating mechanism wherein a temperature control is incorporated with a means for varying the effective areas of the heat interchange element associated with the refrigerating compartment.

A further object of the invention is to provide a means by which the temperature of a refrigerating compartment is maintained at a predetermined variable value and means is provided for varying the temperature of the heat transfer element associated therewith.

Further objects, not specifically enumerated above, will be apparent as the invention is described in greater detail in connection with the accompanying drawings, wherein:

Figure 1 is a plan view showing schematically a common form of refrigeration apparatus in which control means has been incorporated to permit the control of the area of the heat interchange element which serves to maintain a predetermined refrigerating space at a desired temperature.

Figure 2 is a plan view partly broken away and in section showing a refrigerating system constructed in accordance with the present invention, the system being designed for use particularly in connection with motor vehicle bodies.

Figure 3 is a view in section, taken on line 3—3 of Figure 2, and partly broken away to show the details of the valve mechanism for controlling the flow of cooling fluid in accordance with this invention.

Figure 4 is a partial view in section taken on line 4—4 of Figure 3, and looking in the direction of the arrows showing the parallel ducts formed above the heat interchange element and control means therefor whereby the effective area of the heat interchange element may be varied as desired.

Figure 5 is a view in section, similar to Figure 4, showing a modified form of controlling means for rendering a desired portion of the area of a heat interchange element ineffective.

Figure 6 is a view in section, taken on line 6—6 of Figure 5, and looking in the direction of the arrows.

Referring to the construction shown in Figure 1, a well known form of refrigerating mechanism has been illustrated, such mechanism including a compressor 10 which may be driven by an electric motor 11. The compressor is connected to a coil 13' in a heat interchange device 12 and compresses the expanded gas, supplying it to a condenser 13'' which may be cooled by any suitable means such, for example, as a forced ventilation system. From the condenser, where the gas is condensed and cooled, it is expanded through an expanding valve 13''' and returned to the coil 13' through pipe 13. Another coil 14' in the heat interchange device is connected to a pipe 14, while a motor driven circulating pump 15' is connected to the other end of coil 14' and to a pipe 15. Pipes 14 and 15 are connected to the heat interchange elements of the mechanism now to be described. Pipe 14 communicates with a manifold 16 which receives fluid from a plurality of cooling pipes 17, while pipe 15 communicates with a manifold 18 for supplying fluid to the cooling pipes 17. The number of pipes 17 extending between the manifolds 16 and 18 may be varied to suit individual installations and of course may be provided with a plurality of fins or vanes 19 to promote the interchange of heat between the pipes and the space adjacent the same.

Valves 20 are connected between the lengths of pipes 17 and the supply manifold 18 in order that the pipes 17 may be selectively connected to the manifold 18. A suitable temperature control mechanism 21 may be provided to control the operation of the compressor, the details of such control mechanism constituting no part of the present invention.

In operation, to preserve a desired humidity in the refrigerating space surrounding the pipe sections 17, at the same time maintaining a predetermined temperature therein by means of the temperature controlling element 21, the temperature of the pipe sections 17 which are in communication with the supply manifold 18 is determined and the temperature difference between them and the refrigerating space around the sections 17, is noted. The relative humidity of the refrigerated space bears a very definite and fixed relationship to the temperature differential between the refrigerated space and the heat interchange elements therefor. For example, if the temperature of the refrigerated space is 35° and the temperature of the heat interchange element is 35°, the relative humidity of the air within the refrigerated space may be 100°. With a refrigerated space temperature of 35° and a temperature of 34° in the heat interchange element, the relative humidity within the refrigerated space is approximately 96.3. Inasmuch as the number of pipe sections 17 in communication with the supply manifold 18 bears a direct proportion to the refrigerating effect of the system, a desired temperature may theoretically be maintained in the refrigerated space with only one of the pipe sections, the temperature of such section being extremely low where the temperature of the refrigerated space is to be maintained at a low value. Under such conditions, the temperature differential between the temperature of the space and the temperature of the single pipe sections 17 so employed would be very great and the relative humidity within the refrigerated space would be extremely low because of the rapid condensation of moisture about the low temperature heat interchange pipe sections 17. By increasing the number of pipe sections which are called upon to do the refrigerating, the temperature of such sections may be brought nearer to the temperature of the refrigerated space thus reducing the moisture condensation and frosting which takes place on the heat interchange elements. It will thus be seen that by maintaining a proper temperature relationship between the temperature of the refrigerated space and the temperature of the heat interchange elements, a predetermined humidity may be maintained in the refrigerated space. The control of the heat interchange elements or pipe sections 17 has been illustrated as being effected by means of valves 20. Obviously, any means of rendering ineffective the interchange of heat between the said pipe sections and the refrigerated space may be utilized without departing from the scope of the invention.

In the construction shown in Figures 2, 3, and 4, a vehicle body has been shown in which the present invention has been embodied. This body is shown at 22 and may be formed of suitable heat insulating material. At a suitable point in the body a refrigerant chamber 23 is formed, such chamber being adapted to receive a refrigerant 24 which may be solid carbon dioxide or other suitable refrigerating means. A primary heat interchange element 25 is provided in the compartment 23 upon which the refrigerant 24 rests. A cooling fluid is circulated between the primary heat interchange element 25 and a secondary heat interchange element 26 by means of a fan 27 and motor 28, ducts 29 and 30 communicating between the primary and secondary elements to afford a closed circulating system therebetween.

The secondary element 26 preferably is of extended area covering the entire top of the body 22. The secondary element 26 forms the bottom wall of a compartment 31 which is formed with side longitudinal chambers 32 and 33, respectively. These chambers are formed by longitudinal partition members 34 and 35, respectively, chamber 32 communicating with the supply duct 29 and chamber 33 with the discharge duct 30. Transverse partitions 36 are provided between the partitions 34 and 35 in sufficient number to provide a plurality of sub-compartments 37 which communicate with the respective chambers 32 and 33 through apertures 38 and 39, respectively. The number of sub-compartments 37 may be varied in accordance with the nicety with which the humidity of the refrigerated space is to be controlled and the specific number therefore is of no importance in connection with the structure described herein.

In order that the control of fluid through the sub-compartments 37 may be effected, slide valves 40 are provided in sliding relationship with respect to the apertures 38. These valves 40 may be slidably mounted in guides 41 having operating handles 42 formed thereon for facilitating the actuation thereof.

The motor 38 may be controlled by a thermostat 43 in accordance with existing practice in order that the flow of fluid through the closed refrigerating system, above described, may be conveniently controlled. This thermostat may be set for a predetermined temperature and the humidity of the refrigerated space within the body 22 may be controlled by selecting a predetermined number of the sub-compartments 37 as the conducting paths for the circulating cooling fluid. With all of the sub-compartments 37 functioning in parallel in order that the entire surface of the secondary cooling plate 26 may serve as a heat interchange element, the temperature difference between the space within the body 22 and the temperature of the heat interchange plate 26 will be a minimum and thus a relatively high humidity may be preserved within such space. By closing predetermined valves 40, selected sub-compartments 37 may be disconnected or connected selectively from the supply chamber 32 and, as the number of sub-compartments 37 decreases, the temperature of the secondary heat interchange plate 26 necessary to maintain a predetermined temperature within the body 22 decreases thus decreasing the relative humidity therein. In the event that solid carbon dioxide is used as the primary refrigerant, a conduit 44 is provided between the chamber 23 and the suction side of the fan 27 in order that the sublimated $CO_2$ may be directed into and through the closed circuit between the primary and secondary heat interchange elements.

In the construction shown in Figures 5 and 6, the means for controlling the area of the secondary heat interchange plate which is effective as a refrigerating element is in the form of a screen 45 which replaces the valves 40. This screen may be of suitable heat insulating material and may be mounted upon a roller 46 supported upon brackets 47 at one end of the body. The screen may pass over a guide roller 48 and the sides thereof supported upon parallel guides 49 at the sides of the body. In this fashion all of the compartment 31 serves as a conducting means for the circulating fluid but by varying the position of the screen 45, a predetermined portion of the area of the secondary heat interchange plate may be rendered ineffective as a heat interchange element thus throwing the burden of preserving a predetermined temperature within the refrigerated space upon the remaining portion of the secondary heat interchange element. By varying the position of the screen 45, the temperature difference between the refrigerated space and the effective secondary heat interchange surface 26 may be controlled thus controlling the relative humidity within the refrigerated space. Obviously, the roller 46 may be spring operated and any suitable means provided for effecting the actuation of the screen along the guides 49.

From the foregoing, it will be seen that the humidity control may be effected in the following manner. Assuming that a desired temperature of 35° is to be maintained within the refrigerated space and that the product to be stored or transported within the space requires a relative humidity of 90% to prevent deterioration thereof, the circulation of the fluid over or through the heat interchange member is controlled by the circulating fan or pump. To preserve a relative humidity of approximately 90%, it can be determined that the heat interchange plate (plate 26 in Figures 2, 3, 4, 5, and 6 and pipe sections 17 in Figure 1) must be maintained at a temperature of approximately 32°. If the temperature of the heat interchange element is above 32°, the effective area of the heat interchange element is reduced in order that the temperature of such area may be brought to 32°. The reverse operation would be effected if the temperature of the heat interchange element is found to be too low.

It will thus be seen that an effective means has been provided to control the humidity of a refrigerated space while preserving the temperature thereof at a predetermined value.

I claim as my invention:

1. The method of controlling humidity in a refrigerating system having a refrigerated space, a heat interchange element, and a cooling fluid circulating system comprising maintaining a predetermined temperature in the refrigerated space, determining the temperature of the heat interchange element, and preserving a desired temperature differential between the space and element by varying the effective area of the heat interchange element.

2. The method of controlling humidity in a refrigerating system having a refrigerated space and a heat interchange element, comprising maintaining a predetermined temperature in the refrigerated space, determining the temperature of the heat interchange element, and varying the effective area of the element to preserve a desired temperature differential between the space and element whereby the humidity within the space will vary in proportion to the area of the element.

3. A heat interchange system comprising a compartment, a heat interchange surface associated with the compartment, means to supply a fluid to the heat interchange surface, means to vary the quantity of fluid so supplied to maintain a desired temperature in the compartment, and means to vary the area of the surface to vary the humidity of the compartment in proportion thereto.

4. A heat interchange system comprising a compartment, a heat interchange surface associated with the compartment, means to supply a fluid to the surface to maintain a desired temperature in the compartment, means to vary the rate of flow of the fluid in accordance with the temperature in the compartment, and means to vary the area of the surface to vary the humidity in the compartment in proportion thereto.

EDWIN M. POST, Jr.